Figure 1:
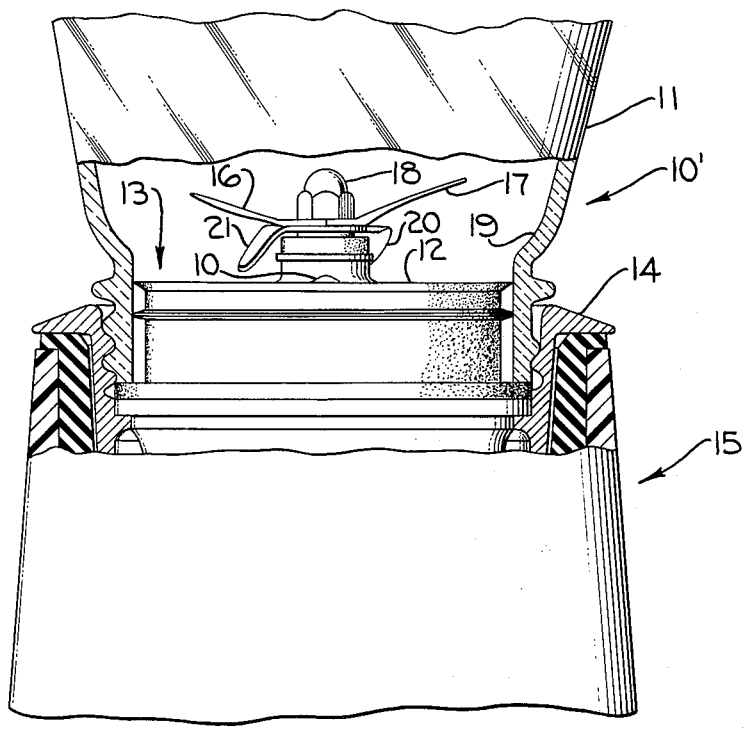

Nov. 9, 1965   H. A. DEWENTER   3,216,473
COMMINUTION APPARATUS
Filed Aug. 1, 1963

HENRY A. DEWENTER
INVENTOR.
KENDRICK AND STOLZY
BY
ATTORNEYS.

3,216,473
COMMINUTION APPARATUS
Henry A. Dewenter, 1477 Old Mill Road,
San Marino, Calif.
Filed Aug. 1, 1963, Ser. No. 299,286
2 Claims. (Cl. 146—68)

This invention relates to pulverizing devices employing a receptacle having a vertically extending wall and a base through which a vertical rotatable shaft is positioned to carry a bladed member, and more particularly to a receptacle base which causes materials to be comminuted efficiently and to a very high degree within a very short time.

Although the apparatus of the present invention is intended for use with a blender, the scope of its application is, of course, not limited thereto.

One conventional use of a blender is to pulverize raw carrots. In such a case, a piece of carrot frequently becomes lodged on a blender cutting blade and drags across the bottom of the blender receptacle. This causes the blender motor to overheat and to reduce comminution efficiency.

In accordance with the present invention, the above-described and other disadvantages of the prior art are overcome by providing a blender including a receptacle having a vertically extending wall and a base, a shaft extending vertically through the base, a bladed member fixed relative to the upper end of the shaft, the bladed member having a radially extending sharp edge, the receptacle base having a flat upper surface, and a radially extending rib fixed to the upper surface of said base. In effect, the rib "knocks" food particles such as carrot chunks off of the blender blade. This not only prevents the blender motor from overheating, it also improves blender comminution efficiency.

Notwithstanding the advantages of the present invention as just stated, it is also an unusually useful yet unobvious advantage of the present invention that the product of the blender will pass through a finer mesh screen than it will when the rib is not employed. This is true whether or not a chunk of food happens to become lodged on a blender blade.

The above described and other advantages of the present invention will be better understood from the following description when considered in connection with the accompanying drawings.

Figure 2:
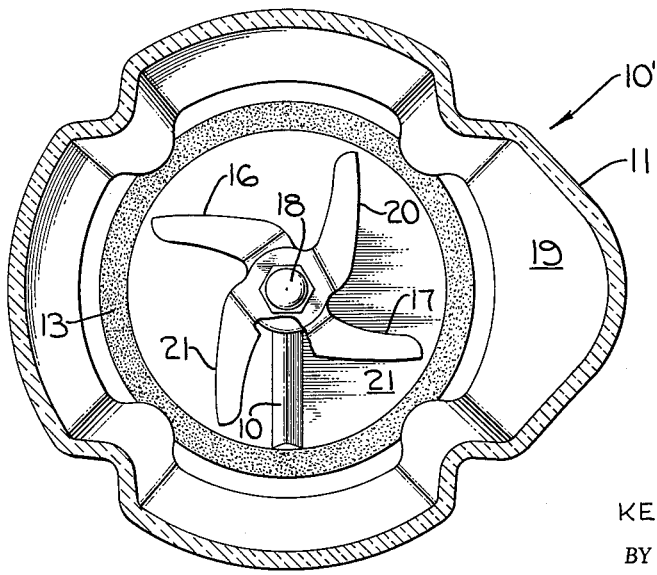

In the drawings which are to be regarded as merely illustrative:

FIG. 1 is a broken away side elevational view, partly in section, of a blender constructed in accordance with the present invention; and FIG. 2 is a transverse sectional view of the blender looking down upon a pair of bladed members or a knife assembly.

The blender of the present invention, except for a rib 10 shown in FIGS. 1 and 2, may be identical to either embodiment of the invention shown in the drawings of United States Patent No. 3,064,949. Further, note will be taken that, except for rib 10, the drawings in the instant case are very similar to FIGS. 13 and 14 in the drawings of said patent.

The blender of the present invention includes a container assembly 10′ having a receptacle 11 identical to that shown in FIG. 12 of said patent and having a bottom surface at 12 which is the top surface of an insert 13 identical to insert 122 of the said patent, except for the said rib 10. Insert 13 is held tightly in receptacle 11 by a screw cap 14 identical to screw cap 109 of the said patent.

The blender of the present invention also employs a base assembly 15 identical to a base assembly 100 of said patent. Base assembly 15 houses an electric motor, not shown, which rotates blades 16 and 17 fixed to a shaft 18 rotatable in insert 13.

Receptacle 11 is provided with a wall 19 which with insert 13 provides means to hold materials to be comminuted.

The upper surface 12 of insert 13 is flat, as shown in both FIGS. 1 and 2. Rib 10 extends radially from the center of insert 13 and is triangular in its transverse cross section with the base of the triangle being located on the upper flat surface 12 of insert 13.

Blades 20 and 21 extend downwardly toward and are contiguous to top insert surface 12 and the upper edge of rib 10 but are spaced a short distance therefrom.

In accordance with the foregoing, it will be appreciated that rib 10 will "wipe" blades 20 and 21 free from food chunks. Further, it is a striking yet unobvious advantage of the present invention that even though food chunks do not become lodged upon blades 20 and 21, the presence of rib 10 will improve comminution efficiency over the absence thereof from the other structures shown in the drawing.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. A blender comprising: a receptacle having a vertically extending wall and a base; a shaft extending vertically through said base; a bladed member fixed relative to the upper end of said shaft, said bladed member having a radially extending sharp edge, said base having a substantially flat upper surface and a radially and upwardly extending rib fixed to the upper surface of said base, said bladed member extending downwardly from the top of said shaft contiguous to but spaced from said rib.

2. A blender comprising: a receptacle having a vertically extending wall and a base; a shaft extending vertically through said base; a bladed member fixed relative to the upper end of said shaft, said bladed member having a radially extending sharp edge, said receptacle base having a flat upper surface; and a radially extending rib fixed to the upper surface of said base, the cross-section of said rib being triangular with the base of the triangle located on the said upper base surface, said bladed member extending downwardly from the top of said shaft contiguous to but spaced from said rib.

References Cited by the Examiner
UNITED STATES PATENTS

| | | |
|---|---|---|
| 2,004,582 | 6/35 | Muffly. |
| 2,352,205 | 6/44 | Karlson. |
| 3,064,949 | 11/62 | Dewenter _____ 259—108 |
| 3,095,022 | 6/63 | Schmook _____ 146—68 X |

J. SPENCER OVERHOLSER, *Primary Examiner.*